United States Patent [19]

Roszyk et al.

[11] 4,091,317
[45] May 23, 1978

[54] WINDSHIELD WIPER CONTROL APPARATUS

[75] Inventors: Leon M. Roszyk, Downers Grove; H. William Mammen, Hillside; John B. Buchner, Crestwood, all of Ill.

[73] Assignee: Sunbeam Corporation, Chicago, Ill.

[21] Appl. No.: 725,963

[22] Filed: Sep. 23, 1976

[51] Int. Cl.² .................... H02K 33/00; H02P 3/00
[52] U.S. Cl. ................................. 318/369; 318/120; 318/DIG. 2
[58] Field of Search ............ 318/379, 381, 369, 120, 318/DIG. 2

[56] References Cited

U.S. PATENT DOCUMENTS 3,783,362   1/1974   Basso ........................... 318/DIG. 2

*Primary Examiner*—Robert K. Schaefer
*Assistant Examiner*—L. Pojunas
*Attorney, Agent, or Firm*—George R. Clark; Neil M. Rose; Clifford A. Dean

[57] ABSTRACT

A variable delay windshield wiper control system is provided in conjunction with a conventional windshield wiper system of an automobile to control the operation wiper drive source and wiper drive mechanism at predetermined variable intervals. The variable delay wiper control system operates independently of the conventional wiper switch and is effective to provide an adjustable delay interval between successive windshield wiper sweeps or reciprocative paths as is desirable during light rain or precipitation conditions.

The wiper control system includes a timing circuit which generates variable duration intervals and directly effects operation of the drive source at the end of each of the intervals, and a delay control adjusted by the operator. A control switch is also provided for disabling the variable delay wiper control system and for effecting operation of the timing circuit. The control switch is also effective to directly control operation of the conventional drive source in one arrangement whereby an immediate windshield wiper sweep referred to as an "instant-on" condition is effected when the windshield wiper control system switch is moved from the off to the on position.

Another arrangement of the variable delay windshield wiper control system utilizes a control switch that initializes the timing circuit to provide an "instant-on" or immediate first wiper sweep upon actuation of the control switch so that a windshield wiper sweep clears the windshield immediately upon the actuation of the control system as opposed to waiting for the end of the first delay interval.

18 Claims, 6 Drawing Figures

WINDSHIELD WIPER CONTROL APPARATUS

BACKGROUND OF THE INVENTION

A. Field of the Invention

The present invention relates generally to the field of windshield wiper control systems and more particularly to a windshield wiper control system that provides a selectable and continuously variable delay interval between successive windshield wiper sweeps and that may be utilized in conjunction with a conventional wiper switch as provided by the manufacturer of an automobile with the conventional wiper switch operating independently of the variable delay windshield wiper control system.

B. Background of the Invention

Various windshield wiper control system arrangements of the prior art provide intermittent or variable speed operation of the windshield wiper system as provided by the manufacturer of an automobile. In these arrangements the speed of the windshield wipers or the delay time between successive wiper sweeps is varied under the control of an operator by the use of numerous electrical circuit arrangements.

A first type of windshield wiper control system that has a single wiper control switch and that utilizes a switching circuit in combination with a delay time circuit and a timing termination circuit is described in U.S. Pat. No. 3,492,558 which issued to R. K. Patterson, Jr. et al, on Jan. 27, 1970. This control system is effective to activate the switching circuit when the ignition switch is operated and to provide an initial sweep of the wipers when the single wiper control switch is activated. Thereafter, the timing circuit determines the delay time between successive operations or sweeps of the wipers as it charges up a timing termination circuit turns off the system after actuation of the wiper mechanism.

Another type of windshield wiper control system of the prior art described in U.S. Pat. No. 3,780,367 which issued to W. D. Holt on Dec. 18, 1973, utilizes a single wiper control switch, a variable delay timing circuit and a washer-initial sweep circuit. The single control switch is arranged to have positions corresponding to an off or nonoperating mode, a slow position, a fast position and an intermittent position. When the control switch is rotated from the off position to the intermittent position, a momentary contact is established to actuate the washer and the initial sweep circuit which includes a timing capacitor that produces several sweep operations of the wiper mechanism during the timing or discharge of the capacitor through a first relay in the washer-initial sweep circuit. As the control switch is fully rotated to the intermittent position, the delay timing circuitry utilizes a second timing capacitor and a second relay to produce successive sweeps spaced apart by a variable selectable delay interval. Both the delay timing circuitry and the initial sweep circuitry have adjustable controls to vary the number of initial sweeps and the delay time between successive sweeps in the intermittent position.

Other types of windshield wiper control circuits utilizing various types of time delay circuitry are described in the following U.S. Pat. Nos.: 3,581,178; 3,564,374, 3,219,901; 3,262,042, 3,353,079; 3,335,352; 3,364,410; and 3,483,459.

While the windshield wiper control arrangements of the prior art as discussed and referenced hereinabove are generally suitable for their intended purpose, they involve either complicated arrangements to provide initial operation of the wiper control system upon actuation in the intermittent or variable delay mode, or no provision for an immediate wiper sweep upon actuation of the wiper control system in the intermittent mode.

Further, the windshield wiper control systems of the prior art are not generally suitable for use in conjunction with the conventional wiper switch supplied by the manufacturer of the automobile. These prior art arrangements generally contemplate the replacement of the original equipment wiper control switch or the installation of the overall wiper control system as original equipment. Thus, the conventional wiper control switch provided as original equipment is not generally capable of operation independently of the intermittent wiper control system.

SUMMARY OF THE INVENTION

Accordingly, it is a principal object of the present invention to provide a variable delay windshield wiper control system arrangement which avoids one or more of the above described disadvantages of the prior art.

Another object of the present invention is a variable delay windshield wiper control system that provides an immediate wiper sweep cycle upon actuation of the control system in a simple manner by either initialization of a time delay circuit or by a variable delay control switch that directly effects operation of the conventional wiper drive source; the operation of the variable delay wiper control system being independent of the conventional original equipment wiper switch.

A further object of the present invention is a variable delay windshield wiper control system for variable speed operation that provides a delay between successive wiper cycles under light precipitation conditions to prevent streaking or dry operation of the wiper blades and that is easily connected in an after-market fashion to conventional wiper control systems provided as OEM (original equipment manufacturer) equipment by an automobile manufacturer; the conventional wiper switch provided as OEM equipment being operable independently of the variable delay speed wiper control system.

A further object of the present invention is a selectable delay windshield wiper control system which is inexpensive in its manufacture and does not duplicate the provisions and operations of the conventional OEM wiper control and wiper switch arrangements.

Briefly in accordance with the present invention, a variable delay windshield wiper control system is provided for selectively effecting operation of a conventional electrical drive source and a wiper drive mechanism for a wiper blade at predetermined variable intervals and with a selectable variable delay between successive wiper cycles.

The variable delay windshield wiper control system includes a timing circuit for generating variable duration intervals and effecting operation of the conventional electrical drive source at the end of each of the intervals. A delay control device is connected to the timing circuitry for determining the duration of the variable intervals and the delay between successive wiper cycles and is continuously variable between a minimum and maximum position. Further, a control device is provided that controls the operation of the timing circuitry and directly effects operation of the conventional electrical drive source upon actuation of the control device by an operator from a first position corresponding to the off position to a second position corresponding to an operational state wherein the timing circuitry effects operation of the conventional electrical drive source at a normal operational speed and with the successive wiper cycles being spaced apart by the selectable variable delay.

In a first arrangement, the control device includes a three position-double pole switch wherein one position is a momentary position as the switch is moved from the off to the operational state to thereby provide an immediate first wiper sweep or "instant-on" arrangement upon actuation of the switch. In a second arrangement, the control switch includes an "instant-on" switch which is a momentary contact switch to provide the first immediate sweep and a second double pole-single throw switch to effect operation from the off state to the on state. A third arrangement includes a control switch in a three pole-double throw arrangement which initializes the timing circuitry to provide a first immediate sweep of the wiper blades when the control switch is moved from the off to the on position.

The variable delay windshield wiper control system of the present invention is easily incorporated into the conventional OEM wiper control system of an automobile and operates in conjunction with the conventional wiper switch as provided by the manufacturer so that the conventional wiper switch also operates independently of and overrides the control switch of the variable delay wiper control system. A control panel that attaches to the dashboard of the automobile is provided that carries the control switch and the adjustable delay control.

BRIEF DESCRIPTION OF THE DRAWINGS

The invention both as to its organization and method of operation together with further objects and advantages thereof, will best be understood by reference to the following specification taken in conjunction with the accompanying drawings, in which.

DESCRIPTION OF THE PREFERRED EMBODIMENT

Figures 1, 4:
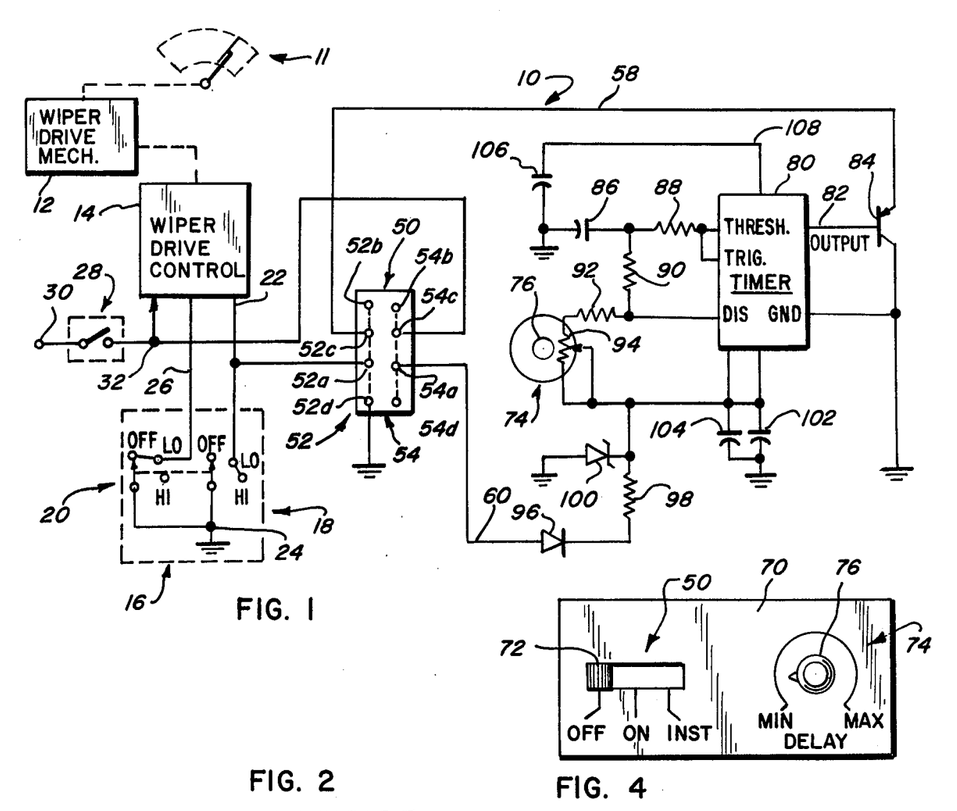
FIG. 1 is an electrical schematic diagram of a conventional OEM windshield wiper system of an automobile and the variable delay windshield wiper control system of the present invention to thereby provide improved windshield wiper control and operational features.
FIG. 4 is a pictorial representation of a control panel utilized to control the operation of the variable delay wiper control system of the present invention as shown in FIG. 1.

The variable delay windshield wiper control system of the present invention indicated generally at 10 and referring to FIG. 1 is utilized in conjunction with a conventional OEM windshield wiper system having a wiper drive mechanism 12 such as a gear box which is arranged to move the windshield wiper blades referred to generally at 11 in a reciprocative path or wiper cycle across the windshield of an automobile. The wiper drive mechanism 12 is driven by a wiper drive control arrangement 14 which includes a DC electrical motor and a park switch to operate the wiper drive mechanism 12 and return the wiper blades to the park or home position normally below the windshield when a conventional OEM wiper switch 16 is deactivated by the operator.

The wiper switch arrangement 16 controls the operation of the wiper drive control stage 14 and includes two three position switches operated on a common shaft referred to as a three position-double pole switch wherein a first three position on-off switch 18 controls the actuation of the wiper drive control stage 14 and a second three position switch 20 controls the speed of operation of the wiper blades when the wiper drive control stage 14 is actuated.

A control lead 22 is provided from the wiper drive control stage 14 to the low and high positions of the on-off switch 18 whereby the control lead 22 is connected to a reference potential such as a ground potential 24 of the vehicle electrical system when the switch 18 is in the low or high position and no connection is provided to the control lead 22 when the switch 18 is in the off position. The switch 20 is arranged in the off and low positions to connect a speed control lead 26 of the wiper drive control stage 14 to the ground potential 24 and no connection is made to the speed control lead 26 with the switch 20 in the high position.

A conventional ignition switch arrangement 28 provides a reference potential 30 such as the battery voltage to a switched supply lead 32 of the wiper drive control 14 upon actuation of the ignition switch 28.

The wiper switch 16 controls the operation of the wiper drive control stage 14 to rotate the wiper drive mechanism 12 thereby operating the windshield wiper blades 11 in either a low or high speed mode of operation. The wiper drive control stage 14, referring to FIGS. 2 and 3, includes a DC electrical drive motor 34 having a series field winding 36 and a shunt field winding 38.

Figure 2:
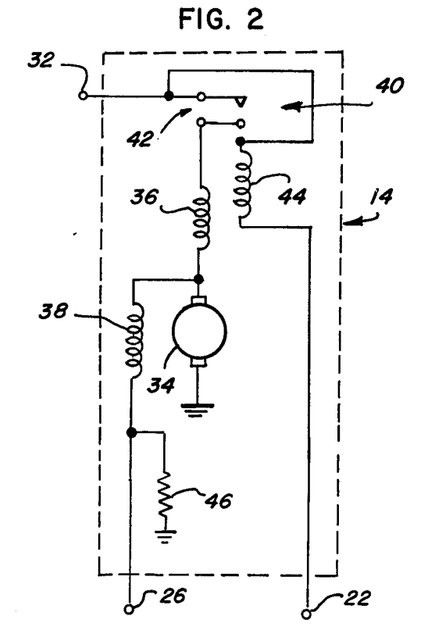
FIG. 2 is an electrical schematic diagram of a conventional OEM windshield wiper drive control arrangement that is suitable to be utilized in connection with the variable delay wiper control arrangement shown in FIG. 1.

In a first conventional arrangement, FIG. 2, the switched ignition voltage 32 is connected to the series winding 36 through the contacts 42 of a park switch and relay arrangement 40 which are in an open condition when the wiper blades are in the parked or home position and in a closed condition when the wiper blades are in any position other than the park position. The contacts 42 are controlled to be closed in the park position when a coil winding 44 of the park switch relay 40 is energized. The relay coil winding 44 is connected between the switched ignition lead 32 and the control lead 22 so that the relay coil 44 is energized whenever the control lead 22 is grounded by the switch 18.

The series field winding 36 of the motor 34 has one end connected to the switched ignition voltage 32 through the contact pair 42 and the other end connected through the armature circuit of the motor 34 to the ground potential so that the motor 34 is energized when the contact pair 42 is closed. The shunt field winding 38 of the motor 34 is connected between the speed control lead 26 and the junction of the series winding 36 and the armature of the motor 34. A shunt field resistor 46 is connected between ground and the junction of the shunt field 38 and the speed control lead 26. This establishes a weakened shunt field whenever the control lead 26 is not connected to ground.

With the switch 20 in the off or low positions, current is provided through the shunt field winding 38 resulting in a low speed operation of the motor 34. The motor 34 operates at a high speed condition when the switch 20 is rotated to the high position so that a small value of current flows through the shunt field winding 38 while a normal armature current flows through the series field winding 36.

Figure 3:
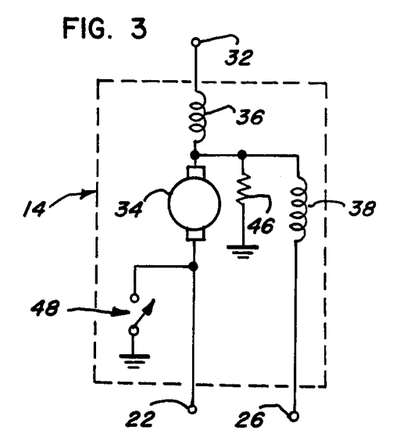
FIG. 3 is an electrical schematic diagram of a second conventional OEM wiper drive control arrangement utilized in automobiles and suitable for operation in conjunction with the variable delay wiper control system arrangement of the present invention illustrated in FIG. 1.

In a second conventional wiper drive control arrangement and referring to FIG. 3, the series field winding 36 of the motor 34 has one end connected to the switched ignition voltage 32 and the other end connected through the armature circuit of the motor 34 to the control lead 22.

A park switch 48 is provided between ground and the junction of the control lead 22 and the armature circuit of the motor 34 thereby connecting one side of the armature circuit to ground when the park switch is closed. The park switch 48 is open when the wiper blades are in the park position and closed at all other positions of the reciprocative path.

The shunt field winding 38 is connected between the speed control lead 26 and the junction of the series winding 36 and the armature circuit of motor 34 as in the arrangement of FIG. 2. Similarly a shunt field resistor 46 is provided between ground and the junction of the series field winding 36 and the armature circuit of the motor 34.

In this arrangement, FIG. 3, the control of the motor 34 is accomplished by grounding the control lead 22 through the switch 18 wherein the switch contacts of switch 18 carry the full motor current through the series field winding 36 and the armature circuit of the motor 34. As in the arrangement of FIG. 2, the shunt field winding 38 is connected to ground through switch 20 to supply a high shunt field condition resulting in the low speed mode of operation of the motor 34 when the switch 20 is in the off or low position. With switch 20 in the high position, no connection is made to the shunt field winding 38 and high speed operation results.

In accordance with an important aspect of the present invention, the variable delay wiper control system 10 is connected in the conventional OEM windshield wiper system of a vehicle to the switched ignition voltage 32, the wiper drive control lead 22 and the ground reference 24 of the electrical system of the vehicle to provide a selectable variable delay mode of operation of the wiper blades 11 by controlling the wiper drive control 14 independently of the OEM wiper switch 16 at predetermined variable intervals such that the operator may select a variable delay between successive wiper sweeps or cycles.

In the preferred embodiment, the variable delay windshield wiper control system 10 is installed as an after-market feature rather than as OEM equipment, that is, for installation on vehicles after delivery from the manufacturer rather than for installation by the manufacturer on the production line. Thus, the functions of the OEM wiper switch 16 of a vehicle are not duplicated in the variable delay windshield wiper control system 10 and the OEM wiper switch is operable independently of the variable delay arrangement 10. In an alternate embodiment, however, it is contemplated that the variable delay windshield wiper control system 10 may be installed as OEM equipment by the manufacturer and incorporate the function of the conventional wiper switch 16.

When the variable delay wiper control system 10 is operational, the conventional wiper switch 16 may still be operated independently of and overrides the wiper control system 10.

Operation of the variable delay wiper control system 10 is controlled by a switch arrangement indicated generally at 50 which in the arrangement of FIG. 1 is a three position-double pole switch wherein a first position corresponds to the off state of the variable delay wiper control system 10, a second position corresponds to the on or operational state and a third position is a momentary contact position to provide an "instant-on" wiper sweep as will be explained in detail hereinafter. The momentary contact position is obtained either as the switch is moved from the off to the on position in one specific embodiment or as the switch is moved past the on position to the momentary or "instant-on" position and then is automatically returned to the on position.

The three position-double pole switch 50 is a conventional three positon rotary switch in one embodiment operated by a common shaft or a three position slide switch in a preferred specific embodiment, FIGS. 1 and 4, which is operated by a moveable slide actuator and includes a first switch layer 52 and a second switch layer 54. The common terminal 52a of the first switch 52 of the arrangement 50 is connected to the wiper drive control lead 22. A first contact terminal 52b of the switch 52 corresponds to the off position and is an open circuit so that no termination is provided to the control lead 22 in the off position. The switch contact terminal 52c corresponding to the on position of switch 52 is connected to an output control lead 58 of the variable delay wiper control arrangement 10 and a third contact terminal 52d corresponding to the momentary contact position of the switch 52 is connected to the ground potential 24.

The second switch layer 54 of the control switch arrangement 50 has a common terminal 54a which is connected to a voltage supply input 60 of the variable delay windshield wiper control arrangement 10. The off position contact terminal 54b and the momentary contact position terminal 54d of the switch 54 are not utilized and have no connections. The on position contact terminal 54c is connected to the switched ignition voltage 32. Thus, the switched ignition voltage is connected to the voltage supply input 60 when the switch 50 is in the on position.

In a specific embodiment of the switching arrangement 50, a slide switch may be utilized with a single push button or slide actuator which has the off position, on position and momentary "instant-on" contact positions referred to hereinabove arranged from left to right so that the slide actuator may be moved from the off position to the right into the "instant-on" momentary contact position. The switch 50 is provided with a spring-biased arrangement to return the slide actuator to the on position where the slide actuator remains until the operator moves the switch from the on position in a left direction to the off position.

In a specific alternate embodiment, the slide actuator when being moved from the left to the right may have an on position detent wherein the operator can either move the switch from the off to the on position or from the off to the "instant-on" position similarly as above with a spring-biased return arrangement.

In the preferred embodiment, a control panel arrangement 70 is provided, referring to FIG. 4, which is attached to the automobile dashboard at a convenient location for the operator and includes a slide switch arrangement 50 wherein a slide actuator 72 is provided having an off position, an on position and an "instant-on" position as described hereinabove. A delay control 74 is also provided on the control panel 70 which is a rotary control operated by a control knob 76 so that the delay control is rotatable and continuously variable between two stop positions defining the minimum and maximum delay positions obtainable as will be described hereinafter. If a rotary arrangement is utilized for the switch 50, an "instant-on" momentary contact position is also provided with a spring-biased return in a rotary direction.

In accordance with an important aspect of the present invention, the variable delay wiper control arrangement 10 provides output control signals at 58 to activate the wiper drive control stage 14 by means of control lead 22 when the control switch 50 is in the on position. Specifically, an integrated circuit timer 80 is programmed by the variable delay control 74 to generate a control signal output 82 at predetermined intervals. The output 82 of the integrated circuit timer 80 is a low voltage level during a portion of each timing interval and a high voltage level throughout the remainder of each timing interval. The output 82 controls the conductive state of a PNP transistor 84 which is connected to provide a conductive path from the wiper drive control lead 22 to the ground potential.

The integrated circuit timer 80 in a preferred specific embodiment is an SE 555 CV device manufactured by Signetics or an SG 555M available from Silicon General. The integrated circuit timer 80 provides accurate timing intervals by producing a low output level during the time the resistive-capacitive timing circuitry associated with the integrated circuit timer 80 is discharging and a high output level during the interval when the resistive-capacitive circuitry is charging.

Basically, the integrated circuit timer 80 includes two comparators controlling the state of a flip-flop which drives a discharge transistor stage and an output stage. In accordance with the present invention, the timer stage 80 is arranged to operate in an astable mode and free runs as a multivibrator. Specifically, an external timing capacitor 86 is connected at one end to ground and at the other end to the threshold and the trigger inputs of the timer stage 80 through a series resistor 88. The series combination of two resistors 90 and 92 and a variable resistor 94 of the delay control 74 is connected between the Vcc supply input of the timer 80 and the junction of the timing capacitor 86 and the resistor 88 to form the resistance portion of the resistive-capacitive timing arrangement.

The switched ignition voltage 32 is provided to the voltage supply input 60, with the switch 54 in the on position, and to the reset and the Vcc supply inputs of the timer 80 through a diode 96 (anode to cathode) and a series resistor 98. A zener diode 100 is connected between the Vcc input of the timer 80 and ground to provide a stable reference voltage to the timer stage 80. Two filter capacitors 102 and 104 are connected between the Vcc input of the timer 80 and ground. A filter capacitor 106 is connected between the control lead 108 of the timer 80 and ground to provide a termination to the control input which is not utilized in the preferred embodiment but may be used to vary the internal reference voltage of the timer 80.

In operation the external timing capacitor 86 is charged through timing resistors 90 and 92 and potentiometer 94. When a voltage level at the level sensitive threshold input of the timer 80 reaches approximately two-thirds of the supply voltage Vcc, an internal flip-flop in the timer circuit 80 is reset thereby switching the output 82 to a low state. The output 82 remains at a low state until the level sensitive trigger input is brought below a level which is approximately one-third the supply voltage Vcc thereby setting the flip-flop and returning the output 82 to a high state.

The discharge lead of the timer circuit 80 is connected to the junction of resistors 90 and 92 and is effective when the internal flip-flop is reset and the output state 82 is a low level to provide a discharge path for the external timing capacitor 86 through the series resistor 90. As the capacitor 86 discharges to a level of approximately one-third the Vcc supply voltage, the trigger input is effective to set the flip-flop and return the output 82 to a high-level state as well as disabling the discharge lead. The capacitor 86 is then returned to a charging mode through the resistors 90, 92 and the potentiometer 94. This process continues in an astable mode with alternate charging and discharging of the capacitor 86 with respective durations of high and low level output states at output 82. Thus, variable timing intervals are generated with successive low output states occurring in a periodic, accurately timed manner at the output 82 with the duration of each interval being constant for a specific resistance of the potentiometer 94 and being selectively variable by the setting of the potentiometer 94.

The output 82 of the timer stage 80 is connected to the base lead of the output control transistor 84. The collector of the transistor 84 is connected to ground and the emitter is connected to the output control lead 58 of the variable delay wiper control arrangement 10. The emitter of the transistor 84 is connected to the wiper control lead 22 when the switch 50 is in the on position. When the output 82 is a low level state, the control transistor 84 is switched to a conductive state so as to provide a path to ground for the control lead 22 of the wiper drive control stage 14 which actuates the OEM wiper control system to provide a full reciprocative path of the wiper.

The discharge time of the timer 80 as defined by the resistor 90 and the external capacitor 86 is chosen to provide a low output state at 82 of sufficient duration to actuate the wiper drive control stage 14 to move the wipers from the park position. The duration of the low output state at output 82 is calculated to be shorter than the time for the wipers to complete one reciprocative path or cycle at low speed operation so that only one reciprocative path is provided for each timing interval. In practice, the time duration of the low output state at output 82 is only a small percentage of the time duration for a complete wiper cycle in order to be sufficient to actuate the wiper drive control stage 14 to complete a path.

As the potentiometer 94 is varied from its minimum to maximum positions by the control knob 76 of the delay control arrangement 74, the duration of each interval at the output 82 as defined by the time between successive transitions from a high level state to a low level state is correspondingly varied. Thus, the operator may select a delay between successive wiper cycles of approximately 2 seconds to 30 seconds from the minimum to maximum settings of the potentiometer 94 in a specific embodiment.

In accordance with another important aspect of the present invention, when the switch arrangement 50 is moved from the off position to the "instant-on" position the control lead 22 of the wiper drive control 14 is momentarily grounded through contact 52d for a sufficient time period to energize the wiper drive control stage 14 to complete a reciprocative path or cycle of operation of the wipers. The momentary ground through contact 52d energizes the wiper drive control stage 14 and the cycle is completed by the park switch arrangement 40 of FIG. 2 or 48 of FIG. 3. In this manner, when the operator turns the variable delay wiper control system 10 to the operational or on state, a first immediate wiper cycle will be provided without waiting for the timer arrangement 80 to provide a low output state corresponding to the charging time of capacitor 86.

In a specific embodiment, the following parameters and circuit elements were found to be suitable in practicing the present invention although they should not be interpreted in a limiting sense: capacitor 86, 100 microfarads; resistor 90, 15 Kohms; resistor 92, 33 Kohms; range of potentiometer 94, 0 to 300 Kohms; resistor 88, 1 Megohm; transistor 84, type 2N6111 or equivalent.

For a detailed description of the operation and circuitry of the integrated circuit timer 80, reference may be made to the Signetics data sheets and application notes and also to Chapter 7 of Applications of Linear Integrated Circuits, by Eugene R. Hnatek, published by John Wiley and Sons, 1975.

Figure 5:
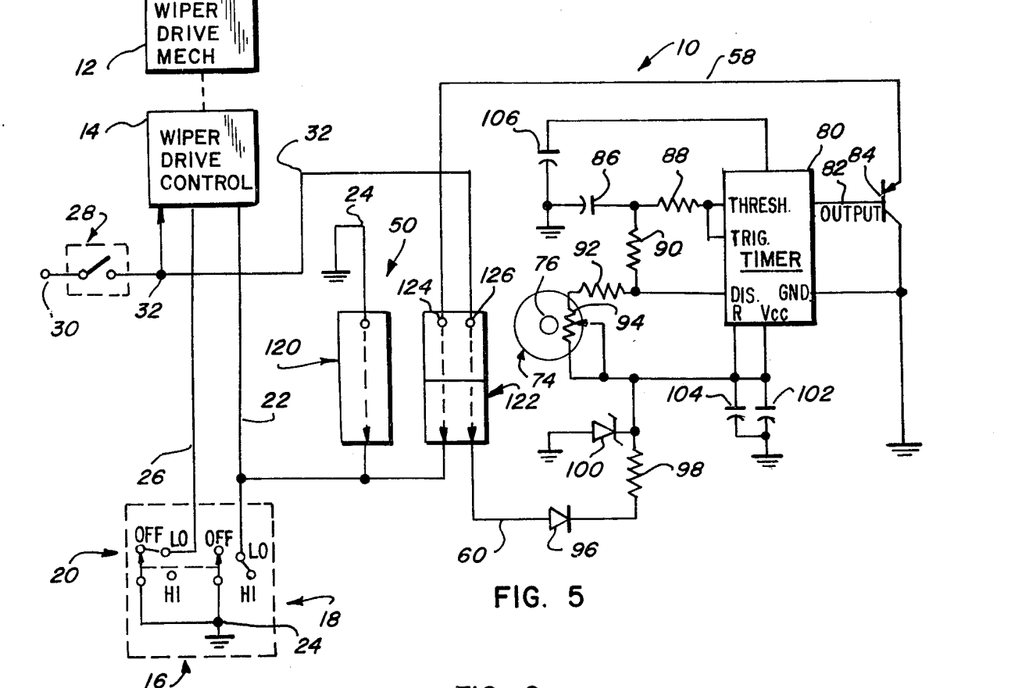
FIG. 5 is an electrical schematic diagram of a second arrangement of the variable delay wiper control system of the present invention illustrated in conjunction with a conventional OEM wiper drive system.

In accordance with a further important aspect of the present invention and referring to FIG. 5, a second arrangement of the variable delay wiper control system 10 is provided wherein the switching arrangement 50 includes a one position (single pole-single throw) "instant-on" switch 120 and an independently operated one position (double pole-single throw) on-off switch 122. The timing stage 80 and associated control circuitry of the variable delay wiper control arrangement 10 as shown in FIG. 5 is generally similar to that illustrated in FIG. 1 in both arrangement and operation and like reference numerals represent identical components.

The "instant-on" switch 120 is connected between the control lead 22 of the wiper drive control stage 14 and the ground potential 24. In a specific embodiment the switch 120 is a spring-biased momentary contact switch which is actuated by the operator such as by moving a slide actuator toward the right, for example, with a momentary contact being provided and the switch automatically returning to the off or open state. In this way a momentary ground connection is provided to the control lead 22 so as to provide an immediate cycle or "instant-on" operation of the wiper blades 11.

The on-off switch arrangement 122 includes a first one position switch 124 connected between the control lead 22 and the output control lead 58 of the variable delay wiper control arrangement 10 and a second single position switch 126 connected between the switched ignition voltage 32 and the voltage supply input 60 of the arrangement 10. The switches 124 and 126 are arranged to be operated by a common slide actuator wherein switch 122 is a slide switch in a preferred embodiment. In the alternative, the switch 122 may be a rotary switch and the switches 124 and 126 operated by a common shaft.

In this arrangement of the variable delay windshield wiper control arrangement 10, FIG. 5, and in accordance with an important aspect of the present invention, the operator activates the "instant-on" switch 120 to obtain an immediate wiper cycle and also independently moves the switch 122 to the on position to obtain the successive wiper cycles separated by the selected delay time as long as the switch 122 is in the on position. If the operator does not desire to obtain an "instant-on" cycle of the wipers, only switch 122 need be actuated. As in the arrangement of FIG. 1, the variable delay wiper control arrangement 10 with the associated switch arrangement 50 is operated independently of the conventional switch arrangement 16. Similarly the conventional wiper switch 16 can be operated independently of the variable delay wiper control arrangement 10 in either the low or high speed positions of operation and further can be utilized to override the operation of the variable delay wiper control arrangement 10 while the switch 122 is in the on position.

Figure 6:
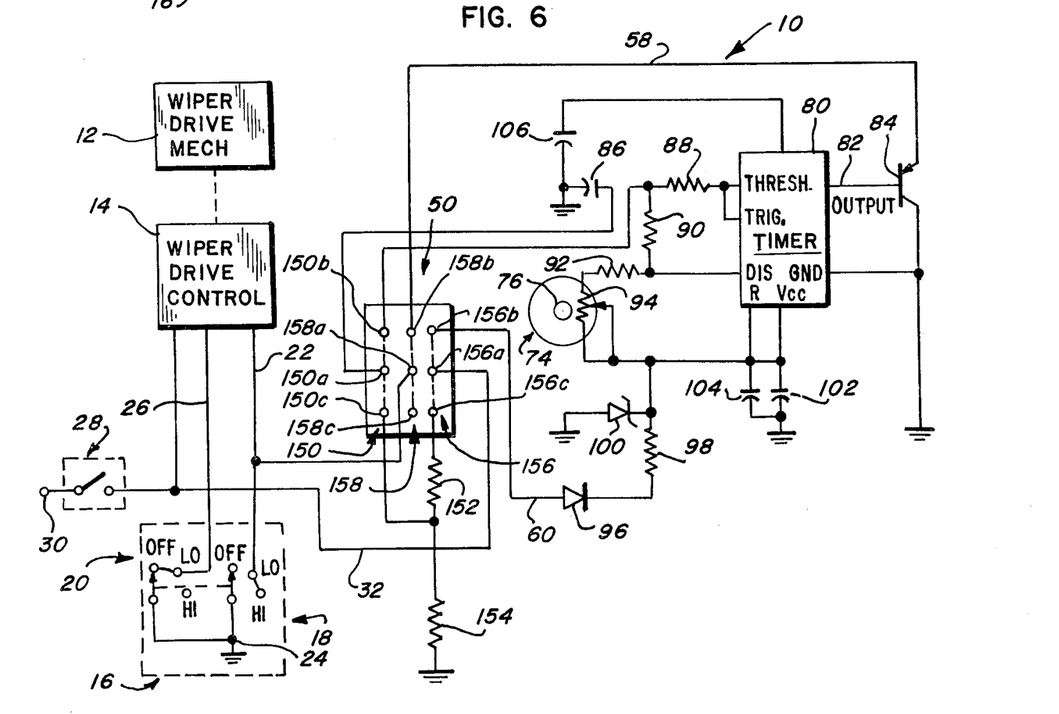
FIG. 6 is an electrical schematic diagram of a third arrangement of a variable delay wiper control system in accordance with the present invention.

In accordance with yet a further important aspect of the present invention and referring to FIG. 6, a third arrangement of the variable delay wiper control arrangement 10 is illustrated utilizing a switching arrangement 50 of a three pole-double throw configuration which may also be referred to as a three pole two position switch and includes three switches 150, 156 and 158.

The first switch 150 of the switching arrangement 50 has a common terminal 150a which is connected to one end of the timing capacitor 86 that is connected to the junction of resistors 88 and 90 in the arrangements of FIGS. 1 and 5 which may also be referred to as the positive or charging terminal of capacitor 86.

In the arrangement of FIG. 6, the capacitor 86 is not directly connected to the junction of resistors 88 and 90 but instead the junction of the resistors 88 and 90 is connected to the on position terminal 150b of the switch 150. Thus, the junction of resistors 88 and 90 is connected to the charging terminal of capacitor 86 when the switch arrangement 50 is in the on position. The off position terminal 150c of the switch 150 is connected to the junction of two resistors 152 and 154 which are connected in series between the ground potential 24 and an off position terminal 156c of the second switch 156 of the switching arrangement 50. The common terminal 156a of the switch 156 is connected to the switched ignition voltage 32. The switched ignition voltage is, therefore, provided to the resisitive divider arrangement formed by resistors 152 and 154 when the switch 156 is in the off position. The on position terminal 156b of the switch 156 is connected to the voltage supply input 60 of the variable delay wiper control arrangement 10.

The third switch 158 has a common terminal 158a connected to the control lead 22 of the wiper control stage 14 and an on position terminal 158b connected to the output control lead 58 of the variable delay wiper control arrangement 10. There is no connection to the off position terminal 158c of switch 158.

In operation and in accordance with another important aspect of the present invention, the switching arrangement 50 in a preferred specific embodiment is a slide switch configuration wherein the switches 150, 156 and 158 are operated by a common slide actuator or in an alternate embodiment switch 50 is a rotary switch wherein the switches 150, 156 and 158 are two-position switches operated by a common shaft arrangement.

In any case, the operator moves the switching arrangement 50 from the off to the on position with an "instant-on" or immediate cycle of the wiper blades being provided and successive wiper cycles being spaced apart by variable delays as selected by the delay control 74 as discussed hereinabove.

Specifically, with the switching arrangement 50 in the off position a reference voltage is developed at the junction of resistors 152 and 154 by means of the switched ignition voltage 32 through the switch contacts 156a and 156c. The reference voltage is provided through contacts 150a and 150c of switch 150 charging the capacitor 86 to the reference voltage which is greater than the threshold voltage of the timer stage 80. When the switching arrangement 50 is moved to the on position, the capacitor 86 is connected to the junction of resistors 88 and 90 through the switch contacts 150b and 150a of switch 150. The voltage at the threshold input of the timer 80 is exceeded and the timer stage 80 is switched to the low output state at 82 rendering transistor 84 conductive. The transistor 84 provides an actuation signal to the wiper drive control stage 14 and thus an "instant-on" or immediate wiper cycle is accomplished as the switching arrangement 50 is operated.

The value of resistors 152 and 154 are chosen to result in a charge condition of capacitor 86 sufficient to exceed the threshold switching requirements of the timer stage 80 and in a specific embodiment a resistance of 4.7 Kohms for resistor 152 and a value of 15 Kohms for resistor 154 have been found suitable to practice the present invention and thereby provide a voltage sufficiently greater than the threshold voltage of the timer stage 80.

After the switching arrangement 50 is switched to the on state and the output 82 of the timer 80 is immediately switched to a low state, the capacitor 86 is subsequently discharged, Successive timing cycles or intervals are generated with predetermined variable delays being provided between successive wiper cycles according to the setting of the potentiometer delay control 74.

While there has been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. A windshield wiper control system for selectively effecting operation of a windshield wiper electrical drive source and a windshield wiper drive mechanism at predetermined variable intervals comprising:
   means for generating variable duration intervals and effecting operation of said windshield wiper electrical drive source at the end of each of said intervals;
   adjustable means connected to said variable interval generating means for determining the duration of said variable duration intervals; and
   switch means for controlling the operation of said variable interval generating means and for directly effecting operation of said windshield wiper electrical drive source for one cycle of operation upon actuation of said control switch means from a first position corresponding to an off state to a second position corresponding to an operational state; said variable interval generating means being energized in said second position,
   said control switch means comprising a three position switch, said third position being a momentary position which is contacted upon actuation of said control switch means from said off to said operational positions, said momentary contact position actuating said windshield wiper electrical drive source for said one cycle of operation as said control switch means is moved from said off to said operational state.

2. The windshield wiper control system of claim 1 wherein said third momentary position is a spring-biased position and wherein said switch automatically returns to said operational position after said switch is moved from said off position to said operational position.

3. The windshield wiper control system of claim 1 wherein said three position switch is a slide activated switch.

4. The windshield wiper control system of claim 1 wherein said three position switch is a rotary activated switch.

5. The windshield wiper control system of claim 1 wherein said three position switch includes two commonly operated poles, said first pole connecting an electrical supply to energize said variable interval generating means in said operational state, said second pole connecting said windshield wiper electrical drive source to the output of said variable interval generating means in said operational state and connecting said windshield wiper electrical drive source to a reference potential in said momentary position.

6. A windshield wiper control system for selectively effecting operation of a windshield wiper electrical drive source and a windshield wiper drive mechanism at predetermined variable intervals comprising:
   means for generating variable duration intervals and effecting operation of said windshield wiper electrical drive source at the end of each of said intervals;
   adjustable means connected to said variable interval generating means for determining the duration of said variable duration intervals; and
   switch means for controlling the operation of said variable interval generating means and for directly effecting operation of said windshield wiper electrical drive source for one cycle of operation upon actuation of said control switch means from a first position corresponding to an off state to a second position corresponding to an operational state; said variable interval generating means being energized in said second position,
   said control switch means comprising a first momentary contact switch and a second switch, said first and second switches being separably operable, said momentary contact switch actuating said windshield wiper electrical drive source for said one cycle of operation, said second switch in the operational position connecting the output of said varible interval generating means to said windshield wiper electrical drive source and connecting an electrical supply to energize said variable interval generating means.

7. The windshield wiper control system of claim 6 wherein said first momentary switch is a spring-biased switch arrangement and wherein said switch automatically returns to an off state after said switch is moved from said off position to said operational position.

8. The windshield wiper control system of claim 7 wherein said first and second switches are slide activated switches.

9. The windshield wiper control system of claim 8 wherein said second switch is a rotary activated switch.

10. The windshield wiper control system of claim 1 further comprising a windshield wiper switch operably connected to said windshield wiper electrical drive source to actuate said drive source independently of said control switch means.

11. The windshield wiper control system of claim 10 wherein said windshield wiper switch is selectively operable to actuate said windshield wiper drive mechanism to operate at a plurality of operating speeds, the operating cycle time of said wiper drive mechanism in said plurality of operating speeds being substantially different than said operating cycle time obtained by said variable interval generating means.

12. The windshield wiper control system of claim 1 wherein said windshield wiper electrical drive source comprises a DC electrical motor and a park position relay, said park position relay including a contact pair and a relay coil, said contact pair connected in series with said DC electrical motor and an electrical supply source, said contact pair being disposed adjacent said windshield wiper drive mechanism to be closed when the drive source is in any position except a predetermined park position and open in said park position, said relay coil when energized closing said contact pair in said park position of said drive mechanism, said contact pair activating said DC electrical motor when in the closed state.

13. The windshield wiper control system of claim 1 wherein said windshield wiper electrical drive source comprises a DC electrical motor and a park position switch, said park position switch being connected in series with said DC electrical motor and an electrical supply, said park position switch being disposed adjacent said windshield wiper drive mechanism to be closed when the drive source is in any position except a predetermined park position and open in said park position, said DC electrical motor being energized when said park position switch is closed.

14. Apparatus for selectively controlling the intermittent operation of a windshield wiper electrical drive source an a windshield wiper drive mechanism, comprising:
means for generating variable duration intervals and effecting operation of said windshield wiper electrical drive source at the end of each of said intervals;
adjustable means connected to said variable interval generating means for determining the duration of said variable duration intervals;
switch means for controlling the operation of said variable interval generating means, said control switch means having a first position corresponding to an off state and a second position corresponding to an operational state; and
initializing means connected to said control switch means for controlling said variable interval generating means to operate said windshield wiper electrical drive source to complete one cycle of operation upon said control switch means being operated from said first to said second positions,
said control switch means comprising a two position-three pole switch, said variable interval generating means being energized by a first pole of said switch, said windshield wiper electrical drive source being connected to the output of said variable interval generating means by a second pole of said switch and said initializing means being connected to said variable interval generating means by said third pole.

15. The arrangement of claim 14 wherein said initializing means provides a reference potential which is connected by the off position contact of said first pole to the off position contact of said third pole of said switch, said variable interval generating means comprising a timer circuit which changes output state upon a threshold input exceeding a predetermined level and a timing capacitor connected to said common contact of said third pole of said switch, said threshold input being connected to said operational position contact of said third pole.

16. The arrangement of claim 15 wherein said initializing means comprises a voltage divider network connected to an electrical supply by the off position contact of said first pole and the divided output of said voltage divider is connected to said off position contact of said third pole of said switch.

17. A windshield wiper control system for selectively effecting operation of a windshield wiper electrical drive source and a windshield wiper drive mechanism at predetermined variable intervals comprising:
means for generating variable duration intervals and effecting operation of said windshield wiper electrical drive source at the end of each of said intervals;
adjustable means connected to said variable interval generating means for determining the duration of said variable duration intervals; and
switch means for controlling the operation of said variable interval generating means and for directly effecting operation of said windshield wiper electrical drive source for one cycle of operation upon actuation of said control switch means from a first position corresponding to an off state to a second position corresponding to an operational state; said variable interval generating means being energized in said second position,
said windshield wiper electrical drive source comprising a DC electrical motor and a park position relay, said park position relay including a contact pair and a relay coil, said contact pair connected in series with said DC electrical motor and an electrical supply source, said contact pair being disposed adjacent said windshield wiper drive mechanism to be closed when the drive source is in any position except a predetermined park position and open in said park position, said relay coil when energized closing said contact pair in said park position of said drive mechanism, said contact pair activating said DC electrical motor when in the closed state.

18. A windshield wiper control system for selectively effecting operation of a windshield wiper electrical drive source and a windshield wiper drive mechanism at predetermined variable intervals comprising:

means for generating variable duration intervals and effecting operation of said windshield wiper electrical drive source at the end of each of said intervals;

adjustable means connected to said variable interval generating means for determining the duration of said variable duration intervals; and switch means for controlling the operation of said variable interval generating means and for directly effecting operation of said windshield wiper electrical drive source for one cycle of operation upon actuation of said control switch means from a first position corresponding to an off state to a second position corresponding to an operational state; said variable interval generating means being energized in said second position, said windshield wiper electrical drive source comprising a DC electrical motor and a park position switch, said park position switch being connected in series with said DC electrical motor and an electrical supply, said park position switch being disposed adjacent said windshield wiper drive mechanism to be closed when the drive source is in any position except a predetermined park position and open in said park position, said DC electrical motor being energized when said park position switch is closed.

* * * * *